United States Patent [19]
Sybertz et al.

[11] 4,085,494
[45] Apr. 25, 1978

[54] METHOD OF AND APPARATUS FOR POSITIONING BLADES OF A WOOD-CHIPPING CUTTER DRUM

[75] Inventors: Hans Sybertz, Hargesheim; Reinhold Riedl, Gensingen, both of Germany

[73] Assignee: Hombak Maschinenfabrik KG, Bad Kreuznach, Germany

[21] Appl. No.: 740,231

[22] Filed: Nov. 8, 1976

[30] Foreign Application Priority Data

Nov. 8, 1975 Germany .............................. 2550318
May 11, 1976 Germany .............................. 7614862

[51] Int. Cl.² ............................................. B23Q 3/00
[52] U.S. Cl. .................................. 29/468; 33/185 R; 144/172; 144/218
[58] Field of Search ............... 29/464, 468; 33/185 R; 144/218, 172

[56] References Cited

U.S. PATENT DOCUMENTS

| 2,402,089 | 6/1946 | Rouse et al. | 33/185 R |
| 2,417,234 | 3/1947 | Calow | 33/185 R |
| 2,506,082 | 5/1950 | Hartman | 33/185 R |
| 3,370,628 | 2/1968 | Waldrop | 33/185 X |

Primary Examiner—Othell M. Simpson
Assistant Examiner—W. D. Bray
Attorney, Agent, or Firm—Michael J. Striker

[57] ABSTRACT

A wood-chipping cutter drum is rotatable about a drum axis and carries at least one elongated blade which has a cutting edge defining an orbit of rotation of the drum and which is radially displaceable in a blade direction relative to the drum axis. An adjustment device for aligning the cutting edge on an ideal desired orbit centered on the drum axis has an elongated alignment bar with a flat surface that can be brought into engagement with the cutting edge of the blade on a non-rotating drum to push it into a position lying exactly on the desired orbit. This bar is pivotal about an axis parallel to the cutting edge being adjusted and positioned relative to this cutting edge so that a line between the point of contact with the bar and the pivot axis for the bar forms a right angle with the displacement direction of the blade in the drum.

9 Claims, 4 Drawing Figures

METHOD OF AND APPARATUS FOR POSITIONING BLADES OF A WOOD-CHIPPING CUTTER DRUM

CROSS-REFERENCE TO RELATED APPLICATION

This application is related to the commonly assigned and copending patent application Ser. No. 701,868 filed July 1, 1976, the entire disclosure of which is herewith incorporated by reference.

BACKGROUND OF THE INVENTION

The present invention relates to a method of and apparatus for adjusting the blade of a cutter drum. More particularly this invention concerns to the adjustment of a blade of a cutter drum used for reducing pieces of wood to chips or the like suitable for the production of chip board, laminates, and the like.

A cutter for a wood-chipping apparatus normally has a cylindrical drum on whose periphery is mounted a plurality of angularly equispaced blades. Each of these blades has an outer cutting edge which defines a line that extends at a slight angle to the axis of rotation of the drum, but which lies in a plane parallel to the rotation axis of the drum. Each of these blades furthermore is formed as a flat bar and has a planar surface terminating at the respective cutting edge. This surface itself defines a plane that extends non-radially of the surface, normally inclined into the direction of rotation of the drum.

In order to achieve most uniform chipping with such a drum it is essential that the cutting edges of the blade all lie on the same desired ideal orbit that is centered on the rotation axis of the drum. This orbit can be a frusto-cone but is almost always a cylinder. If a blade projects beyond this orbit it will wear very rapidly, as it will be the first blade to contact the workpiece, and if a cutting edge lies within the orbit it will never come into contact with the workpiece so that the other cutting edges will do all of the cutting.

For adjustment it is typical to provide an arrangement such as described in the above-identified copending patent application wherein the blades can be mounted in grooves in the surface of the drum and held loosely in place during an adjustment operation. Once the blades are adjusted and properly positioned with their cutting edges lying exactly on the desired orbit, the clamping force is increased in order to lock them tightly in place.

A device is known for carrying out this adjustment operation which comprises a beam or bar having a planar face. This bar is mounted on one or more arms pivoted about an axis which is parallel to the cutting edge of a blade being adjusted. This beam is pivoted into a position where the point of contact between it and a blade being adjusted lies on a line joining the pivot axis for the beam and the rotation axis for the drum. Thus the beam is rotated into this position and the drum is moved past it, thereby pushing the blade into the desired position which is defined by the surface of the beam, this surface lying in a plane parallel to the rotation axis of the drum in the adjustment position.

Such an arrangement has the considerable disadvantage that it applies forces to the blade which tend to remove its edge. Furthermore it is necessary to allow for axial sliding of the surface of the beam relative to the support for this beam, as relative rotation of the drum and beam past each other would cause complete destruction of the cutting edge of the blade being adjusted if such a sliding were not allowed.

Another disadvantage of the known devices is that they are frequently in the way when the machine is in use, limiting access to it and often being fouled with debris. Furthermore they cannot readily be adjusted for different settings of the cutting blades.

SUMMARY OF THE INVENTION

It is therefore an object of the present invention to provide an improved method of and apparatus for adjusting the cutting blades of a cutting drum as described above.

Another object is the provision of such an apparatus which can be used to position the cutting blades very accurately, but which will not harm the cutting edge of the blade being adjusted.

A further object is to provide such a system which can readily be set up for different positionings of the blades, yet which in use of the machine can be completely withdrawn from the working area.

These objects are attained according to the present invention in an arrangement wherein the blade is adjusted while the drum is held against rotation. A flat surface is pivoted about an axis parallel to itself into engagement with the cutting edge of a stationary blade at a point which forms with the pivot axis of the adjustment surface a line that lies at an angle of between 90° and 110° with the displacement direction of the blade in the drum. Thus the surface is displaced substantially exclusively in the displacement direction of the drum against the cutting edge until the point of contact lies on the ideal desired orbit.

With this system the forces displacing the blade in the drum while it is loosely held for adjustment are all directed virtually perfectly in line with the direction in which the blade is displaceable in the drum so that relatively modest forces can be applied to the blade for its adjustment. It is not necessary to apply a relatively great force in another direction so that the vectoral force in the direction of adjustment of the blade is sufficient to move it. For this reason the cutting edge against which the force is applied is unlikely to be damaged.

In accordance with another feature of this invention the adjustment surface is a planar surface and the cutting edge is a straight line. The surface engages the cutting edge at a family of points forming this straight line and the surface is displaced substantially perpendicularly to this line, once again in a direction virtually perfectly in line with the displacement direction of the blade in the drum.

Since the blades are almost invariably canted to the axis of the drum the pivot axis of the adjustment bar is similarly canted and parallel to the cutting edge of a blade in the appropriate locaton on the drum turned toward the adjustment device. Such an arrangement has proven to be extremely effective not only for one-piece blades, but even in relatively large chipping apparatus wherein each blade is formed of a plurality of independent juxtaposed sections. Adjustment of such segmented blades presented almost insuperable problems to the prior-art devices.

In accordance with yet another feature of this invention the adjustment beam is mounted via at least two arms on a shaft connected to means for pivoting the shaft which may take the form of a hydraulic cylinder acting through an arm on this shaft or to a motor lying directly on the shaft. Another arm extending from this shaft according to the present invention is engageable with an abutment displaceable on the frame of the machine. This abutment engages the arm and acts as a rotation stop for the shaft when the adjustment surface lies on the desired orbit for the blade cutting edges. This arm and the abutment are all held in a closed housing that prevents them from becoming fouled with wood chips and the like and insures that the set position will always be maintained.

With the system according to the present invention it is therefore possible to swing the adjustment beam completely out of the way away from the drum during its use. Thus this mechanism, which is ideally permanently fixed adjacent the cutting drum, does not interfere with the normal operation of the machine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
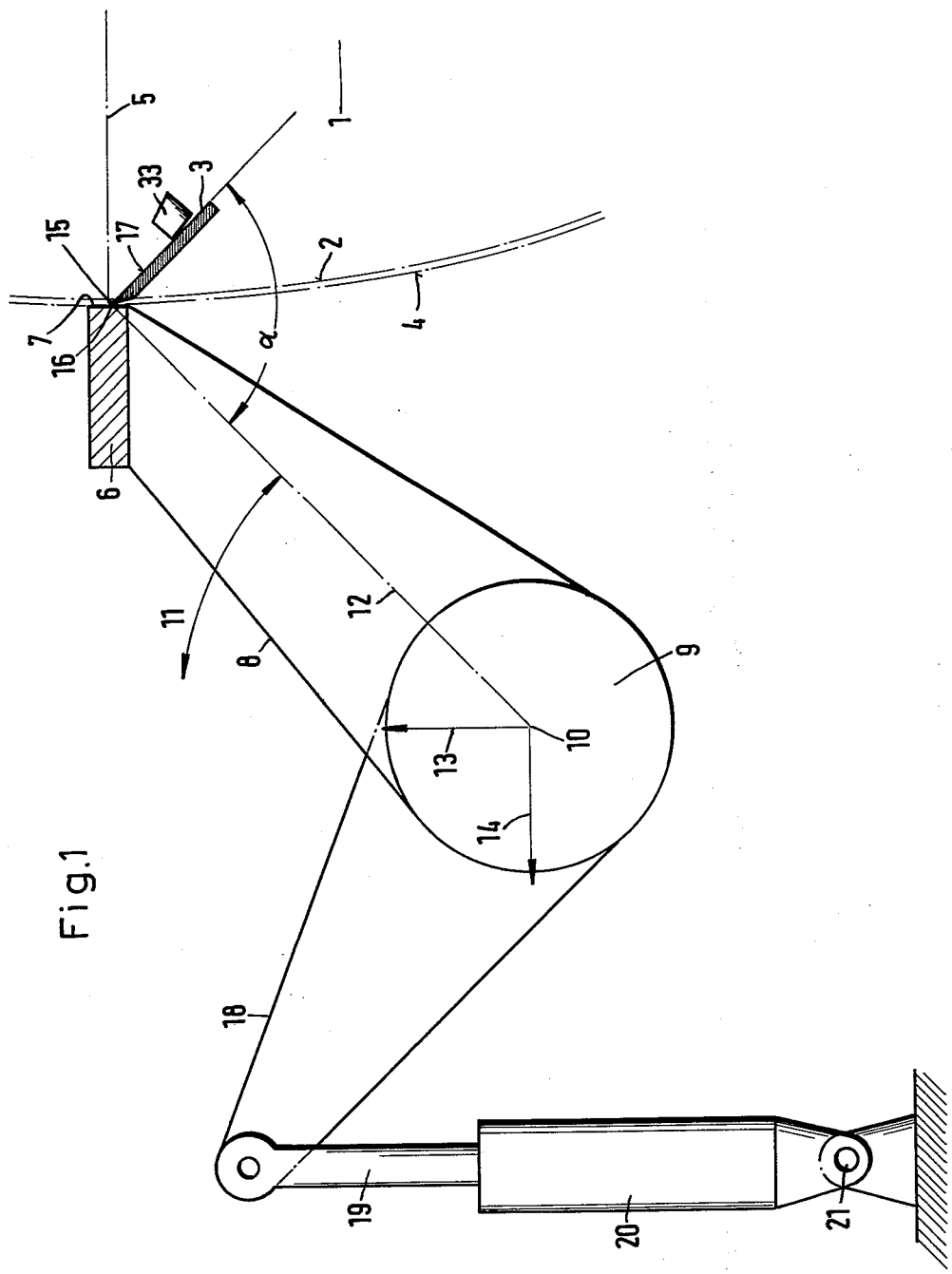
FIG. 1 is a largely diagrammatic vertical cross-section through an apparatus for carrying out the method of this invention.
Figure 2:
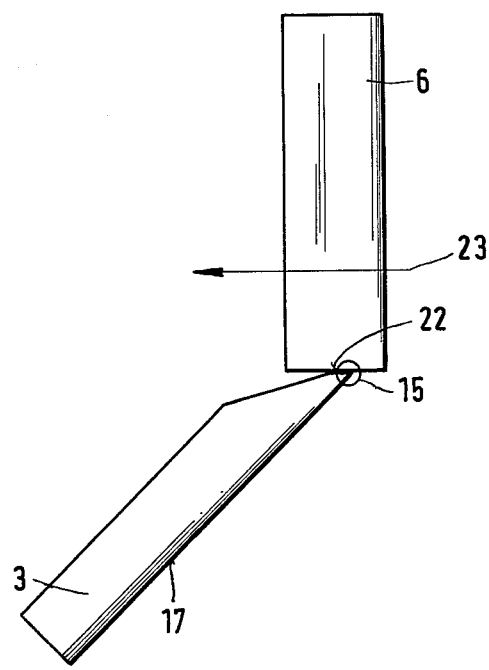
FIG. 2 is a large-scale view of a detail of FIG. 1.

As shown in FIGS. 1 and 2 a chipping apparatus has a blade drum 1 rotatable about a horizontal axis A (FIG. 3) and having a cylindrical external surface 2 from which project a plurality of blades 3 one of which is shown. Each of these blades 3 has acutting edge 16 which defines a straight line that lies at an angle to the rotation axis of the drum 1. This blade 3 has an upper surface 17 terminating at the edge 16 and lying in a plane which forms at each point 15 of intersection between the edge 16 and a radius 5 drawn to the axis of the drum 1 an angle of 45°.

The blades 3 of the drum 1 are to be adjusted so that their cutting edges 16 all lie on the same cylindrical orbit 4 which is centered on the rotation axis of the drum 1 and spaced slightly, by only a few millimeters, from the surface 2 of the drum 1. This positioning is effected by means of a device having an elongated and ridged adjustment or pusher bar 6 having a planar surface 7 positionable tangent to the ideal orbit 4. This bar 6 is carried on a pair of arms 8 extending radially from a shaft 9 having an axis 10 which extends parallel to the cutting edge 16 of a blade 3 engageable as shown in FIG. 1 with the surface 7. The axis 10 is fixed relative to the rotation axis of the drum 1, and the arms 8 may be pivoted through an arc indicated at 11. The axis 10 is positioned so that a straight line 12 drawn between the intersection point 15 of the cutting edge 16 and the axis 10 lies at an angle $\alpha$ of 90° to the surface 17 of the blade 3 being adjusted. This pivoting through the arc 11 is effected by means of a radially extending arm 18 fixed to the shaft 9 and connected at its radially outer end to the piston rod 19 of a double-acting ram 20 mounted on a fixed pivot 21 on the frame of the machine. Expansion of the cylinder 20 brings the surface 7 into engagement with the cutting edge 16 and contraction pulls it away therefrom.

It is possible in accordance with this invention to displace the axis 10 vertically as indicated by arrow 13 or horizontally by arrow 14 in order to change the ideal desired orbit 4.

In use blade 3 to be adjusted is loosely clamped by means 33 in a corresponding groove in the drum 1 and this drum 1 is rotated to bring the blade 3 into a position facing the adjustment device. The drum 1 is then arrested and the cylinder 20 expanded so that the face 7 is pressed against the cutting edge 16 of the blade 3 to push this blade 3 in the direction of its plane 17 until the cutting edge 16 lies exactly on the desired cylindrical orbit 4. At this time expansion of the cylinder 20 is stopped so that the blade 3 is left in this position. Thereafter the clamping means 33 is tightened further to insure that the blade 3 will not slip from the set position.

Figure 3:
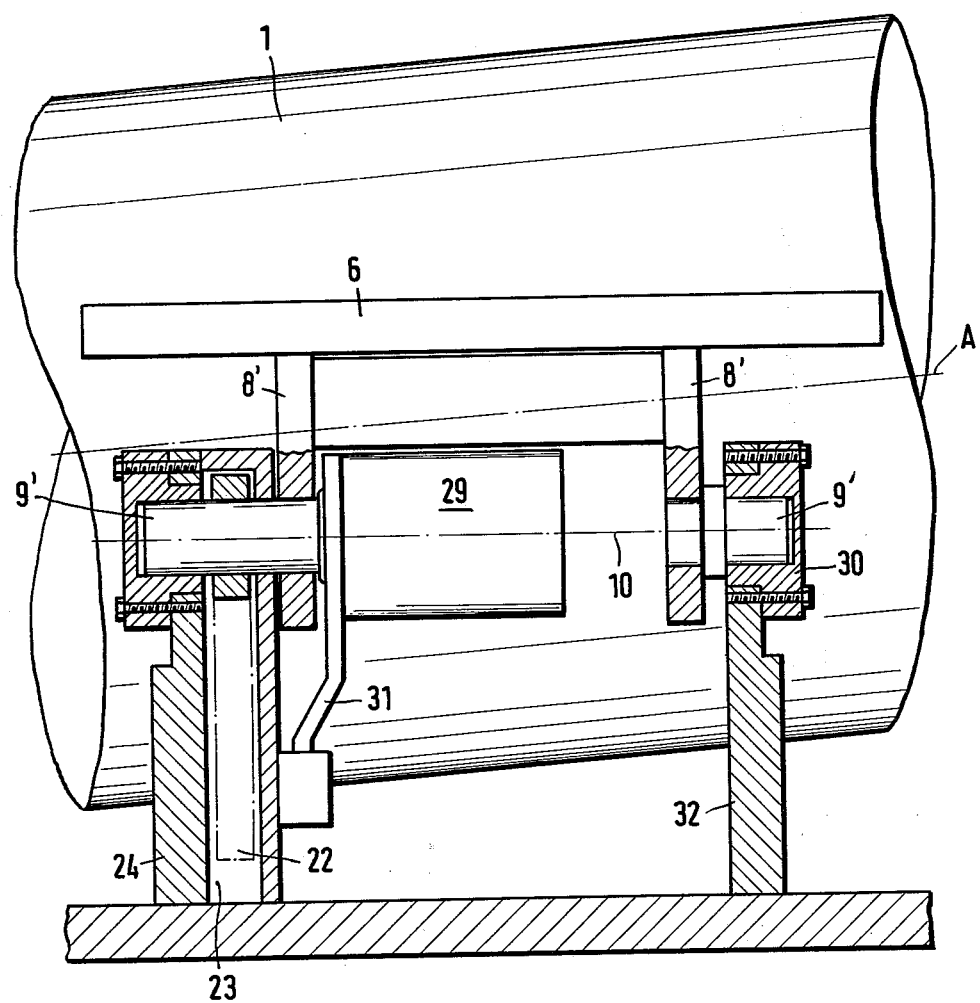
FIG. 3 is a front view of another apparatus for carrying out the method of this invention.
Figure 4:
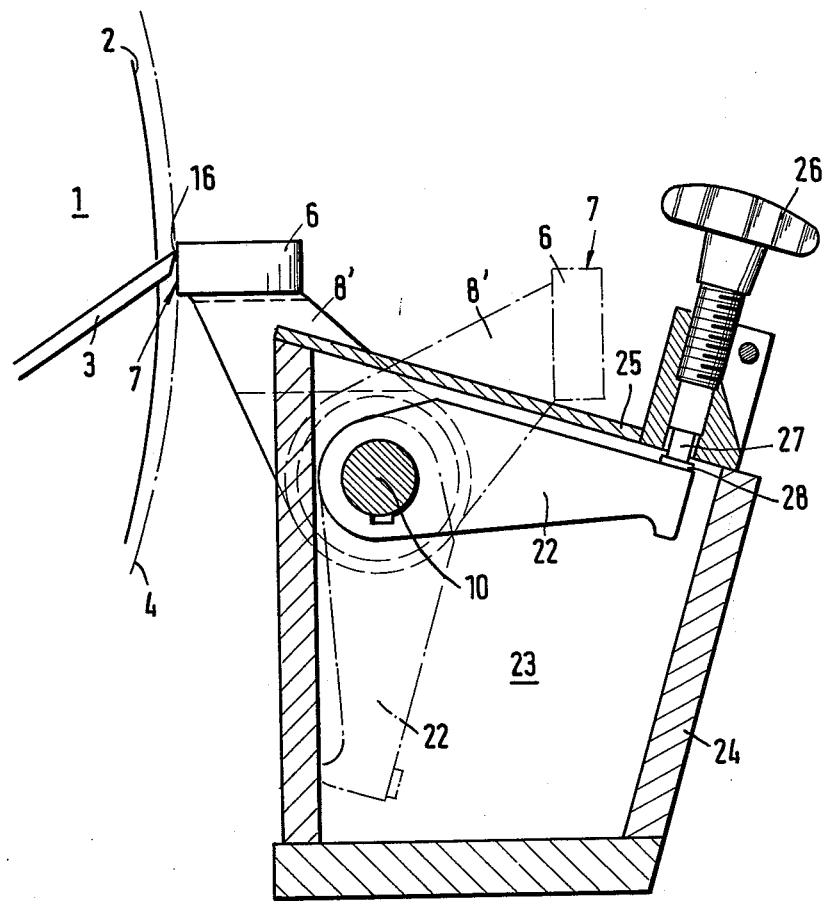
FIG. 4 is a vertical cross-section through the apparatus of FIG. 3.

The arrangement shown in FIGS. 3 and 4 uses the same reference numerals for functionally identical structure. Here, however, the bar 6 which is plainly shown in FIG. 3 to lie at an angle to the axis of the drum 1, is carried on two arms 8' each fixed to a respective pivot pin or gudgeon 9' which together define the axis 10. One of these pins 9' is received in a bearing 30 carried on an upright 32 on the machine base and the other in a bearing 30 which is received on an upright 24 forming part of a closed housing 23 also carried on the machine frame. This one gudgeon 9' at the housing 23 is provided with a radially extending arm 22 keyed to the gudgeon 9' and movable in the dot-dash inoperative position of the device from a vertical position to a generally horizontal position adjacent the upper wall 25 of the housing 23.

This upper wall 25 is provided with an adjustment knob 26 carried on a shaft 27 threaded into the top wall 25 and having a lower end engageable with a hardened plate 28 carried on the outer end of the arm 22.

A pointer is provided on the knob 26 and a scale on the wall 25 in order to indicate just what rest position is defined by the element 27 for the arm 22. Thus it is possible for the user readily to change the end position which will be assumed by the bar 6 simply by rotating the knob 26, and to reproduce very easily any desired setting.

In this arrangement also it is noted that the cylinder 20 is replaced by a rotary hydraulic motor 29 connected via a stop arm 31 to the housing 23. The arms 8' are rotatable by this motor 29 through approximately 90°. Otherwise this arrangement functions identically to the arrangement of FIGS. 1 and 2.

It will be understood that each of the elements described above, or two or more together, may also find a useful application in other types of devices differing from the types described above.

While the invention has been illustrated and described as embodied in an adjustment device, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In combination with a drum elongated in the direction of and rotatable about a drum axis and carrying at least one axially elongated blade having a cutting edge defining an orbit on rotation of said drum and radially displaceable in a blade direction crossing said orbit relative to said drum axis, an adjustment device for aligning said cutting edge on an ideal desired orbit centered on said drum axis, said device comprising:
   an elongated alignment bar having a flat surface and pivotal about a bar axis fixed relative to said drum axis and substantially parallel to said surface; and
   means for pivoting said bar about said bar axis for pressing said surface against said cutting edge and displacing the same toward said drum axis in said blade direction until said cutting edge lies on said ideal desired orbit.

2. The device defined in claim 1, wherein said surface is planar.

3. The device defined in claim 2, wherein said edge is straight.

4. The device defined in claim 1, wherein said bar axis is non-parallel to said drum axis.

5. In combination with a drum rotatable about a drum axis and carrying at least one elongated blade having a cutting edge defining an orbit on rotation of said drum and being radially displaceable in a blade direction crossing said orbit relative to said drum axis an adjustment device for aligning said cutting edge on an ideal desired orbit centered on said drum axis, said device comprising:
   an elongated alignment bar having a flat surface;
   a shaft lying on and defining a bar axis fixed relative to said drum axis and parallel to said surface;
   means fixedly connecting said shaft and said bar for joint rotation about said bar axis;
   an arm extending radially of and fixed to said shaft;
   a fixed abutment engageable with said arm only when said surface is tangent to said desired ideal orbit; and
   means for pivoting said bar about said bar axis for bringing said surface into engagement with said cutting edge and pressing same toward said drum in said blade direction, said blade axis and surface being so oriented that when said surface contacts said cutting edge at a point on said ideal orbit the line between said point and said axis forms an angle of between 90° and 110° with said direction.

6. The device defined in claim 5, further comprising a fixed support and means connected thereto and to said abutment for limitedly displacing and fixing said abutment relative to said fixed point.

7. A method of positioning the cutting edge of a blade of a cutter drum to lie on a desired ideal orbit centered on the drum rotation axis, said blade being displaceable generally radially of said drum axis in a direction crossing said ideal orbit, said method comprising the steps of:
   (a) holding said drum from rotation so that said blade is stationary;
   (b) pivoting a flat surface about an axis parallel to said surface into engagement with said cutting edge at a family of points forming a straight line and
   (c) thereafter displacing said surface substantially exclusively in said direction and perpendicularly to said line against said cutting edge of the stationary blade at said line until said line lies on said ideal desired orbit.

8. A method of positioning the cutting edge of a blade of a cutter drum to lie on a desired ideal orbit centered on the drum rotation axis, said blade being displaceable generally radially of said drum axis in a blade direction crossing said orbit, said method comprising the steps of:
   (a) holding said drum from rotation so that said blade is stationary;
   (b) pivoting a flat surface about an axis parallel to said surface into engagement with said cutting edge of the stationary blade at a blade-surface contact point;
   (c) thereafter displacing said surface substantially exclusively in said blade direction generally radially inwardly toward said drum axis against said cutting edge of the stationary blade at said contact point until said point lies on said ideal desired orbit;
   (d) loosely holding said blade in said drum during steps (a), (b) and (c); and
   (e) thereafter securing said blade tightly in said drum against movement in said direction.

9. The method defined in claim 8, further comprising the step of limiting pivoting of said surface to a position thereof with said surface lying tangent to said ideal desired orbit.

* * * * *